United States Patent
Wagner et al.

(10) Patent No.: US 10,894,921 B2
(45) Date of Patent: *Jan. 19, 2021

(54) PRODUCT RECOVERY PROCESS FOR ADSORBER REGENERATION

(71) Applicant: BASF SE, Ludwigshafen (DE)

(72) Inventors: Hans-Guenter Wagner, Neuleiningen (DE); Christoph Bayer, Nuremberg (DE); Lothar Karrer, Pfungstadt (DE); Sven Crone, Limburgerhof (DE); Markus Eggersmann, Speyer (DE); Kam Wing Wong, Tsuen Wan (CN); Patrik Pietz, Shanghai (CN); Heinz Ruetter, Xanten (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/517,682

(22) PCT Filed: Oct. 9, 2014

(86) PCT No.: PCT/CN2014/088227
§ 371 (c)(1),
(2) Date: Apr. 7, 2017

(87) PCT Pub. No.: WO2016/054787
PCT Pub. Date: Apr. 14, 2016

(65) Prior Publication Data
US 2017/0247621 A1 Aug. 31, 2017

(51) Int. Cl.
*C10G 25/12* (2006.01)
*C10G 57/02* (2006.01)
(Continued)

(52) U.S. Cl.
CPC .............. *C10G 25/12* (2013.01); *B01J 20/08* (2013.01); *B01J 20/3433* (2013.01);
(Continued)

(58) Field of Classification Search
CPC .......... B01D 15/00; B01D 2259/40086; B01D 3/14; C07C 2/06; C07C 5/03;
(Continued)

(56) References Cited

U.S. PATENT DOCUMENTS

| 3,075,023 A | 1/1963 | Garrison et al. |
| 3,208,157 A | 9/1965 | Stark |

(Continued)

FOREIGN PATENT DOCUMENTS

| CN | 103254932 A | 8/2013 |
| DE | 10 2008 007 081 A1 | 8/2009 |

(Continued)

OTHER PUBLICATIONS

Granato, M. A. et. al. "Adsorption Equilibrium of Isobutane and 1-Butene in Zeolite 13X by Molecular Simulation", Ind. Eng. Chem. Res. (2008), 47, pp. 6166-6174. (Year: 2008).*

(Continued)

*Primary Examiner* — Philip Y Louie
*Assistant Examiner* — Jason Y Chong
(74) *Attorney, Agent, or Firm* — Oblon, McClelland, Maier & Neustadt, L.L.P.

(57) ABSTRACT

Disclosed is a process for the regeneration of an adsorber (A1). The adsorber (A1) is regenerated by contact with a gaseous stream (S2) and the outflow of the adsorber (A1) comprising condensate of stream (S2) and organic composition (OC1) collected in a device. After regeneration of the adsorber (A1) the stream (S2) in the adsorber (A1) is replaced completely or at least partially by the content of the device. Then the adsorber (A1) is fed with organic composition comprising at least one olefin, at least one alkane and at least one compound containing oxygen and/or sulfur.

20 Claims, 2 Drawing Sheets

Figure 1:
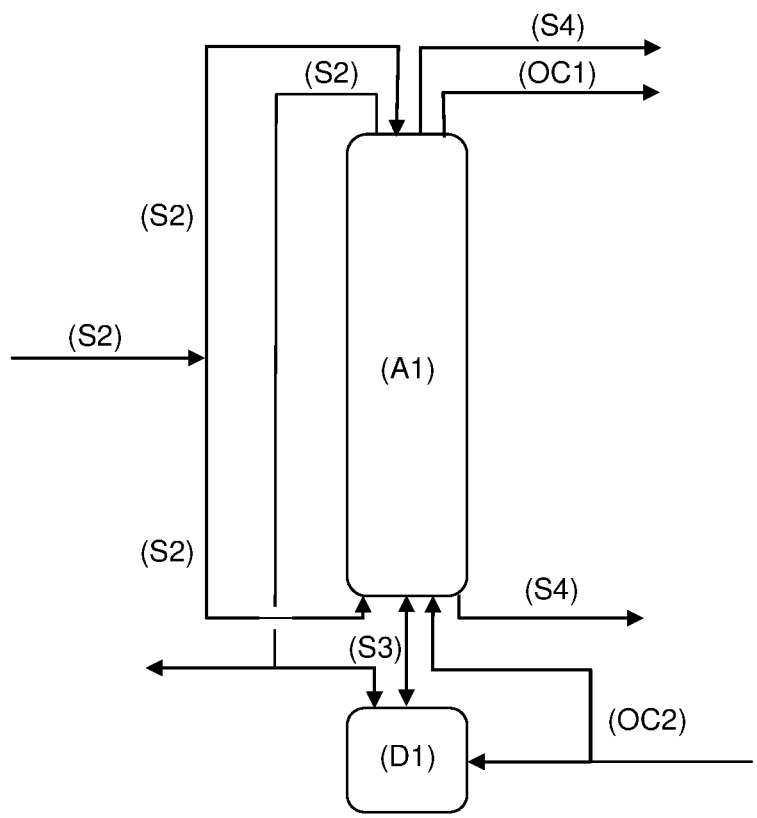

(51) Int. Cl.
*C10G 67/06* (2006.01)
*C10G 69/12* (2006.01)
*B01J 20/08* (2006.01)
*B01J 20/34* (2006.01)

(52) U.S. Cl.
CPC ....... *B01J 20/3458* (2013.01); *B01J 20/3483* (2013.01); *C10G 57/02* (2013.01); *C10G 67/06* (2013.01); *C10G 69/126* (2013.01)

(58) Field of Classification Search
CPC ........ C10G 45/00; C10G 50/00; C10G 57/02; C10G 67/06; C10G 69/126; C10G 25/00; C10G 25/12
USPC ....... 585/255, 820, 800, 826, 502, 512, 500, 585/258
See application file for complete search history.

(56) References Cited

U.S. PATENT DOCUMENTS

| | | | |
|---|---|---|---|
| 3,725,377 A | 4/1973 | Cottle | |
| 4,814,517 A * | 3/1989 | Trubac | C07C 41/36 568/697 |
| 4,935,399 A | 6/1990 | Blackburn et al. | |
| 4,935,400 A | 6/1990 | Blackburn et al. | |
| 4,952,746 A | 8/1990 | Johnson | |
| 5,177,298 A | 1/1993 | Yon et al. | |
| 5,510,566 A * | 4/1996 | Muoio | C07C 41/34 568/697 |
| 6,281,397 B1 * | 8/2001 | Santi | B01J 31/0212 585/250 |
| 6,673,239 B2 | 1/2004 | Johnson et al. | |
| 8,349,037 B2 | 1/2013 | Steiner et al. | |
| 2002/0147377 A1 * | 10/2002 | Kanazirev | B01J 20/041 585/820 |
| 2005/0075528 A1 | 4/2005 | Burkhardt et al. | |
| 2007/0123743 A1 | 5/2007 | Ng et al. | |
| 2008/0200745 A1 | 8/2008 | Sigl et al. | |
| 2011/0200507 A1 | 8/2011 | Steiner et al. | |
| 2011/0301398 A1 * | 12/2011 | Heidemann | C07C 2/10 585/512 |
| 2012/0024324 A1 | 2/2012 | Force et al. | |
| 2015/0065765 A1 * | 3/2015 | Villechange | C10G 25/00 585/254 |

FOREIGN PATENT DOCUMENTS

| | | |
|---|---|---|
| EP | 0 229 994 A1 | 7/1987 |
| FR | 2988398 A1 * | 9/2013 |
| WO | WO 01/83407 A1 | 11/2001 |
| WO | WO 2005/056503 A1 | 6/2005 |
| WO | WO 2006/089956 A2 | 8/2006 |
| WO | WO 2010/023249 A1 | 3/2010 |
| WO | WO 2010/057905 A1 | 5/2010 |

OTHER PUBLICATIONS

U.S. Appl. No. 15/517,558, filed Apr. 7, 2017, Hans-Guenter Wagner, et al.
U.S. Appl. No. 15/517,848, filed Apr. 7, 2017, Hans-Guenter Wagner, et al.
U.S. Appl. No. 15/517,857, filed Apr. 7, 2017, Hans-Guenter Wagner, et al.
U.S. Appl. No. 15/517,695, filed Apr. 7, 2017, Hans-Guenter Wagner, et al.
U.S. Appl. No. 15/517,286, filed Apr. 6, 2017, Hans-Guenter Wagner.
Supplementary European Search Report dated Feb. 1, 2018 in Patent Application 14 90 3676, 2 pages.
Extended European Search Report dated Feb. 8, 2018 in European Patent Application No. 14903676.6, 11 pages.
International Search Report dated May 28, 2015 in PCT/CN2014/088227.
International Preliminary Report on Patentability and Written Opinion dated Apr. 20, 2017 in PCT/CN2014/088227.

\* cited by examiner

PRODUCT RECOVERY PROCESS FOR ADSORBER REGENERATION

The invention relates to a process for the regeneration of an adsorber (A1). The adsorber (A1) is regenerated by contact with a gaseous stream (S2) and the outflow of the adsorber (A1) comprising condensate of stream (S2) and organic composition (OC1) collected in a device. After regeneration of the adsorber (A1) the stream (S2) in the adsorber (A1) is replaced completely or at least partially by the content of the device. Then the adsorber (A1) is fed with organic composition comprising at least one olefin, at least one alkane and at least one compound containing oxygen and/or sulfur.

Technical organic compositions often need to be purified from compounds containing oxygen and/or before use as starting materials in catalyzed reactions. These impurities may inhibit or lower the activities of catalysts. The purification can be performed by employing adsorbers.

WO 2010/057905 A1 discloses a process for the oligomerization of olefins by bringing at least one C2 to C8 olefin into contact with a nickel containing heterogeneous catalyst. Preferably the olefins are passed over an adsorption material before brought in contact with the catalyst in order to prevent catalyst poisoning. However, WO 2010/057905 A1 does not disclose a process for the regeneration of adsorbers.

DE 10 2008 007 081 A1 discloses a process for the production of n-butene-oligomers and 1-butene from a technical mixture-I of $C_4$-hydrocarbons. Analogously to WO 2010/057905 A1, the document mentions the need for the removal of certain compounds containing oxygen and/or sulfur out of the hydrocarbon mixture intended to be used in the catalyzed oligomerization process. The document does not disclose a process for the regeneration of adsorbers.

WO 2005/056503 discloses a composite catalyst for the selective oligomerization of lower alkenes and the production of high octane products. While the oligomerization of lower alkenes and mixtures of alkenes is reported in detail, the use of adsorbers for purification of the starting materials or the regeneration of adsorbers is not mentioned.

WO 01/83407 describes a process for the oligomerization of alkenes having from 3 to 6 carbon atoms using a catalyst containing a zeolite of the MFS structure type under conditions to obtain selectively oligomeric product containing predominant amount of certain oligomers. Like in the previously discussed document of prior art neither the use of adsorbers for purification of starting materials nor their regeneration is part of the disclosure.

In order to remove the adsorbed compounds containing oxygen and/or sulfur the regeneration of the adsorbers is required periodically. This can be achieved, for example, by purging the adsorber with inert gases or hydrocarbons at elevated temperatures. Suitable regeneration media need to be essentially free of olefins and compounds containing oxygen and/or sulfur, in particular free of compounds containing oxygen and sulfur. Residual olefins tend to form detrimental coke and polymer precipitates on the adsorbent, at the temperatures applied, during the regeneration process.

Technical organic compositions comprising olefins purified in an adsorber often comprise significant amounts of saturated hydrocarbons. These purified saturated hydrocarbons may be separated from the olefins in downstream process steps and would be applicable for the regeneration of the adsorbers. However, even after distillation of the product stream, the saturated hydrocarbon fraction usually still contains considerable amounts of residual olefins. Streams containing considerable amounts of olefins cannot successfully be employed for adsorber regeneration due to the increased formation of precipitates and/or coke on the adsorber surface.

U.S. Pat. Nos. 4,935,399 and 4,935,400 both describe a similar process for the reduction of hydrocarbon losses during regeneration of adsorbers containing molecular sieves for the removal of sulfur compounds from liquid hydrocarbon streams. While the process according to U.S. Pat. No. 4,935,399 comprises heating of the adsorber bed directly by a device located within the adsorber bed, in U.S. Pat. No. 4,935,400 the adsorber bed is heated by purging with gaseous hydrocarbon only. Both documents explain the use of hydrocarbon streams for the regeneration of adsorber beds containing molecular sieves, but none of them mentions that collected residual product, remaining in the adsorber after draining, is routed back to the adsorber from a collection device before switching the adsorber to operation mode.

U.S. Pat. No. 5,177,298 discloses a process for regeneration of oxygenate-containing adsorbents using hydrocarbon regenerant streams. The streams used require extra pretreatment by additional adsorbers in order to remove compounds containing sulfur or oxygen. Furthermore, U.S. Pat. No. 5,177,298 does not disclose the collection of residual product remaining in the adsorber in a collection device or feeding back the collected content of the collection device before switching from regeneration to operation mode.

U.S. Pat. No. 6,673,239 B2 discloses a system and process for removing water and compounds containing oxygen and/or sulfur from hydrocarbons and a system and process for regeneration of adsorbents used therein. The regeneration comprises passing an isoparaffin over a wateradsorbent, then passing the isoparaffin over the heteroatomcontaining compound adsorbent. However, analogously to U.S. Pat. Nos. 5,177,298, 6,673,239 B2 does not deal with collection of residual product, remaining in the adsorber, in order to feed it back into the adsorber before switching from regeneration to operation mode.

U.S. 2012/0024324 A1 discloses a process for regeneration of purification beds with a jet compressor in an open loop cycle. A fluid composition comprising an inert gas and a regeneration composition is used as regeneration media. Apart from hydrogen as possible secondary component, further constituents of the fluid composition are not defined. In particular the application of hydrocarbons as regeneration media is not considered in the disclosure.

The problem underlying the present invention consists in the development of a new process for regeneration of adsorbers.

The object is achieved by a process for the regeneration of an adsorber (A1) comprising the steps a) to d):
  a) regenerating the adsorber (A1) by contact with a gaseous stream (S2) comprising at least one alkane,
  b) collecting the outflow of the adsorber (A1) in a device (D1), wherein the outflow comprises condensate of stream (S2) and an organic composition (OC1) comprising at least one olefin, at least one alkane and optionally at least one compound containing oxygen and/or sulfur,
  c) replacing the stream (S2) in the adsorber (A1) completely or at least partially by the content of the device (D1),
  d) feeding the adsorber (A1) with an organic composition (OC2) comprising at least one olefin, at least one alkane and at least one compound containing oxygen and/or sulfur.

The process according to the invention allows the recovery of residual organic composition in the adsorber and therefore prevents or reduces losses of already purified valuable product due to adsorber regeneration.

Collection of recovered organic composition (OC1) in a device (D1) and replacement of stream (S2) in the adsorber (A1) by the content of the device (D1) before reload of the adsorber with technical organic composition (OC2) to be purified lowers the required volume of process streams and size of apparatuses considerably. Alternatively, slow replacement of stream (S2) with further technical organic composition (OC2) would be necessary, thus tremendously increasing process streams with the need for larger equipment being the inevitable result. Furthermore, switching the adsorber directly from regeneration to operation mode would transfer quality and load variations into subsequent process steps. Therefore, the measures according to the present invention retain efficiency of the process and avoid disadvantages of alternative procedures.

The above mentioned features of the present invention are of particular advantage, if higher amounts of compounds containing oxygen and/or sulfur in the technical organic compositions to be purified require frequent regenerations of the adsorber. Without application of the above-mentioned measures according to the present invention, the performance of the overall process for the purification of technical organic compositions, comprising regeneration and operation mode, would be lower due to losses of organic composition and lower total throughput.

In an embodiment where the device (D1) is constructed in a manner that organic composition and stream (S2) form two sufficiently distinguishable phases and/or compositions, the efficiency of the process can be enhanced even more. Organic composition collected in the device (D1) and stream (S2) in the adsorber can exchange their places now directly, without inducing streams from other parts of the assembly. This allows fast replacement of stream (S2) in the adsorber by the content of the device (D1) and other installations of the assembly can be run at lower loads resulting in the reduction of their necessary size.

In a further embodiment of the invention, regeneration media comprising alkanes and olefins, corresponding to stream (S1) within the context of the present invention, can be applied for adsorber regeneration without significant formation of detrimental precipitates of coke and polymers on the adsorber. Within the context of the present invention, the stream (S2) is being employed as regeneration stream or regeneration media of an adsorber. In order to hydrogenate residual olefins in stream (S1) to obtain stream (S2), hydrogen gas and suitable catalysts are required. Therefore, lowering the consumption of regeneration medium reduces the demand for stream (S1) being hydrogenated. By consequence, recurring costs for hydrogen and catalyst regeneration are decreased.

In another embodiment of the present invention, the stream (S1) originates from an earlier process step. Thus, the present invention allows the employment of components as regeneration media for an adsorber whereby said components have been purified earlier on the same adsorber, but which are in fact by-products, for example, within a process for producing octene by dimerization of butene. Such by-products are usually discharged as waste, but within the process of the present invention they can be successfully employed/ converted into a regeneration stream.

Compared to other processes of prior art, no additional purification step to remove compounds containing oxygen and/or sulfur is required since these hydrocarbon mixtures are obtained for example as side products during purification of technical organic compositions comprising olefins by means of adsorbers. The purchase of alternative regeneration media like inert gases is therefore avoided.

Furthermore, another advantage of the present invention can be seen in the fact that one embodiment of the invention allows the operation of at least one adsorber in regeneration mode parallel to the operation of at least one other adsorber in operation mode in the same plant.

In order to enrich the regeneration media as much as possible with adsorbed compounds containing oxygen and/or sulfur and consequently consuming regeneration medium in an amount as low as possible, the flow of the regeneration medium can be directed opposite to the flow of any organic composition in the operation mode of the adsorber.

For cooling of the adsorber the regeneration media can be passed through the adsorber according to the direction of the flow of any organic composition during the operation mode taking full advantage of the temperature gradient within the adsorber, further lowering the consumption of regeneration media.

In summary, operating costs and environmental burden are lowered by reduction of energy consumption, waste, recycling of regeneration media and product loss due to a combination of advantageous measures implemented in the present invention. Furthermore, the present invention provides a method for efficient regeneration of adsorbers.

The invention is specified in more detail as follows:

A process for the regeneration of an adsorber (A1) comprising the following steps a) to d).

Within the context of the present invention, the term "adsorber" comprises the adsorbent as well as the device in which the adsorbent is embedded in. Instead of the term "adsorbent" the expression "adsorber material" may be used. The term adsorber may be used equivalently for adsorbent, even if a certain statement actually refers only to the adsorbent but not to the device in which the adsorbent is embedded in.

The absorber (A1) can be employed for the adsorption of compounds containing oxygen and/or sulphur out of organic compositions. Preferably, the adsorber (A1) can be employed for the adsorption of ethers, alcohols, thiols, thioethers, sulfoxides, ketones, aldehydes or mixtures thereof.

Any adsorbent known to the person skilled in the art being appropriate for performing the adsorption of compounds containing oxygen and/or sulphur out of organic compositions may be applied.

Preferred adsorbents are, for example, molecular sieves with a pore diameter of 4 to 15 Å. Further, molecular sieves applicable are crystalline, natural aluminia silicates, like layer lattice silicates or synthetic molecular sieves. Furthermore, commercially available molecular sieves as sold by the Bayer AG, Dow, Union Carbide, Laporte or Mobil may be used. These molecular sieves can be, for example, zeolites of the A-, X- and Y-type. Moreover, synthetic molecular sieves comprise silicon and aluminum as main components, whereby other atoms as side-components such as lanthanides like gallium, indium and lanthanum or other elements like nickel, cobalt, copper, zinc or silver may be useful. These can be introduced into the zeolite for example by means of an ion-exchange with exchangeable cations.

Likewise, synthetic zeolites can be employed, in which other atoms like boron or phosphorus are incorporated in the layer by co-precipitation.

Further suitable adsorbents are aluminum phosphate, silicon dioxide, kieselgur, titanium dioxide, zirconium dioxide, polymeric adsorbents and mixtures thereof.

The most preferred adsorbent is aluminum oxide, commercially available for example as Selexsorb CDL from BASF.

Preferably the adsorber (A1) is based on aluminum oxide and/or the adsorber (A1) can be employed for the adsorption of compounds containing oxygen and/or sulphur out of organic compositions, preferably the adsorber (A1) can be employed for the adsorption of ethers, alcohols, thiols, thioethers, sulfoxides, ketones, aldehydes or mixtures thereof.

In one embodiment of the invention the adsorber (A1) to be regenerated in step a) to d) (steps a) to d) as defined below) is part of an assembly which contains at least one further adsorber (A2). Preferably the at least one further adsorber (A2) is under its operation mode during the regeneration of the first adsorber (A1) and/or each adsorber within this assembly is identical in respect of the adsorbent and/or its mode of operation.

Regeneration, in the context of the present invention, means desorption and removal of adsorbed compounds containing oxygen and/or sulfur from the adsorber (A1), in particular from the adsorbent in the adsorber (A1). The inventive process for regeneration of the adsorber (A1) may also comprise additional measures/ steps necessary, for example, for preparation of the regeneration medium, the adsorber (A1) itself for regeneration or for enabling the adsorber (A1) after finished regeneration to be operated again for adsorption of compounds containing oxygen and/ or sulphur out of organic compositions.

Consequently, an adsorber, within this invention, can at least be operated in the modes of operation: operation mode or regeneration mode.

An adsorber, within this invention, is in operation mode, when a stream comprising an organic composition (OC1) and/or (OC2) ((OC1) and (OC2) as defined below), comprising at least one alkane and/or at least one olefin and compounds containing oxygen and/or sulfur, preferably not being routed through the adsorber before, is fed into the adsorber and compounds containing oxygen and/or sulfur are adsorbed completely or at least partially from this stream on the adsorbent.

Preferably at least 50%, more preferably at least 80%, most preferably at least 97% of the compounds containing oxygen and/or sulfur are adsorbed from the stream comprising organic composition (OC1) and/or organic composition (OC2) according to the preceding paragraph.

An adsorber, within this invention, is in regeneration mode when measures to remove or measures related to the removal of adsorbed compounds containing oxygen and/or sulphur from the adsorbent are carried out or optionally the definition of the operation mode does not apply.

The steps a), b), c) and d) within the process for regeneration of an adsorber according to the present invention are defined as follows:

In step a) the adsorber (A1) is regenerated by contact with a gaseous stream (S2) comprising at least one alkane.

Preferably the alkane contains 1 to 14, more preferably 3 to 10, most preferably 4 to 6 carbon atoms in its longest chain.

The stream (S2) comprises preferably at least 99 wt-% of at least one alkane, more preferably at least 99.5 wt-% of at least one alkane, most preferably at least 99.9 wt-% of at least one alkane, preferably the alkane is butane.

The at least one alkane can be, for example, linear, branched and/or cyclic and is selected from the group: methane, ethane, propane, butane, pentane, hexane, heptane, octane, nonane and decane. Preferably the at least one alkane is butane.

In the context of the present invention, if not stated otherwise, it is not differentiated between the different isomers of a certain alkane. For example, the term butane may refer to n-butane and/or isobutane.

The stream (S1), stream (S2), organic composition (OC2) and/or organic composition (OC1) ((S1), (OC1) and (OC2) as defined below) may comprise in a specific embodiment one or more further alkanes different from butane, which may be selected from the same alkanes as specified above.

The stream (S2) comprises preferably not more than 1000 wt-ppm olefin, more preferably not more than 500 wt-ppm olefin, most preferably not more than 100 wt-ppm olefin, preferably the olefin is butene.

The olefin in stream (S1), stream (S2), organic composition (OC2) and/or organic composition (OC1) ((S1), (OC1) and (OC2) as defined below) may comprise at least one linear, branched, cyclic monoolefin and/or at least one linear, branched, cyclic olefin containing more than one olefinic double bond. Preferably the olefin has 2 to 14, more preferably 3 to 10, most preferably 4 to 6 carbon atoms in its longest carbon chain.

If more than one stereoisomer of an olefin exists, e.g. the corresponding cis- and trans-isomer, these isomers are, in the context of the present invention, regarded as equivalent. Further, it is not differentiated between constitutional isomers of monoolefins. For example, the term butene may comprise the constitutional isomers 1-butene and/or 2-butene as well as 2-butene the corresponding cis- and/or trans-stereoisomer.

Monoolefins can be, for example, selected from the group: ethene, propene, butene pentene, hexene, heptene, octene, nonene and decene. Preferably, the olefin is butene.

If at least one olefin containing more than one olefinic double bond is present, this olefin is preferably a diene, more preferably butadiene.

The stream (S1), stream (S2), organic composition (OC2) and/or organic composition (OC1) ((S1), (OC2) and (OC1) as defined below) may comprise in a specific embodiment one or more further olefins different from butene which may be selected from the same olefins as specified above.

Preferably step a) comprises component step a1) and at least one of the further following component steps a2) to a5):
 a1) heating the adsorber (A1) by contact with the gaseous stream (S2), wherein the gaseous stream (S2) is condensed within the adsorber (A1),
 a2) heating the adsorber (A1) by contact with the gaseous stream (S2) up to a temperature in the range of 230 to 270° C. without any condensation of the gaseous stream (S2) within the adsorber (A1),
 a3) regeneration of the absorber (A1) at a temperature in the range of 230 to 270° C. by contact with the gaseous stream (S2),
 a4) cooling of the adsorber (A1) by contact with stream (S2) in gaseous state, to a temperature in the range of 80° C. to 120° C. and/or
 a5) cooling of the adsorber (A1) by contact with stream (S2) in liquid state to a temperature below 80° C., preferably to a temperature in the range of 40 to 60° C.

Preferably step g) (as defined below) is carried out prior to step a) and step b) is carried out preferably at the same time as step a) and step a) comprises the component steps a1), followed by a2), followed by a3) followed by step a4) followed by a5).

Condensation, meaning conversion from gaseous into liquid phase, of the components comprised in stream (S2) in step a), in particular in step a1), usually takes place if at least one spot, meaning a spacial element, inside the adsorber, being the adsorbent and/or the adsorber wall, has a temperature, which is below the dew point temperature of the respective components comprised in gaseous stream (S2), present at that spot.

The pressure in the adsorber (A1), being in regeneration mode, is defined by the pressure of stream (S2) in the adsorber.

In case step e) and/or f) (as defined below) are performed, the pressure of stream (S2) in the adsorber (A1) is identical or lower as the pressure of stream (S2) as obtained in step e) and/or f).

Preferably the flow direction of the gaseous stream (S2) through the adsorber (A1) in steps a1), a2), a3) and/or b) is opposite to the flow direction of any organic composition through the same adsorber (A1) during its operation mode, and/or the gaseous stream (S2) in step a4) and/or the liquid stream (S2) in step a5) have the same flow direction through the adsorber (A1) as the flow direction of any organic composition through the same adsorber (A1) during its operation mode.

Preferably the heating rate of the adsorber (A1) does not exceed 60° C/h, more preferably it does not exceed 40° C/h.

Preferably the temperature of the gaseous stream (S2) is not more than 100° C., more preferably not more than 60° C., higher than the temperature of adsorber (A1), especially during the heating steps a1), a2) and/or b) (step b) as defined below).

Preferably the temperature of the gaseous or optionally liquid stream (S2) is not more than 100° C., more preferably not more than 60° C., lower than the temperature of the adsorber (A1), especially during the cooling steps a4) and/or a5).

One further embodiment of the invention comprises at least one of the following features i) to iii):
i) the heating rate of the adsorber (A1) does not exceed 60° C/h, preferably it does not exceed 40° C/h, and/or
ii) the temperature of the gaseous stream (S2) is not more than 100° C., preferably not more than 60° C., higher than the temperature of adsorber (A1), especially during the heating steps a1), a2) and/or b), and/or iii) the temperature of the gaseous or optionally liquid stream (S2) is not more than 100° C., preferably not more than 60° C., lower than the temperature of the adsorber (A1), especially during the cooling steps a4) and/or a5).

Preferably in step a), the outflow obtained from the absorber (A1), comprising gaseous stream (S2) and the impurities removed from the adsorber (A1) is condensed at least partially, preferably by employing at least one condenser and/or at least one cooler.

Preferably at least 30 wt-%, more preferably at least 50 wt-%, most preferably at least 70 wt-% of the outflow obtained from the absorber (A1) in step a) is condensed.

Any appropriate condenser and/or cooler known to the person skilled in the art may be used.

In step b) the outflow of the adsorber (A1) is collected in a device (D1), wherein the outflow comprises condensate of stream (S2) and an organic composition (OC1) comprising at least one olefin, at least one alkane and optionally at least one compound containing oxygen and/or sulphur.

Step b) is performed preferably at the same time as step a).

Any appropriate device or apparatus known to the person skilled in the art may be used as device (D1).

Preferably the device is a vessel suitable to store organic liquids, like hydrocarbons.

Organic composition (OC1) comprises preferably at most 80 wt-%, more preferably at most 70 wt-%, most preferably at most 50 wt-% of at least one alkane. Preferably the at least one alkane is butane.

Further, organic composition (OC1) comprises preferably at least 20 wt-%, more preferably at least 30 wt-%, most preferably at least 50 wt-% of at least one olefin. Preferably the at least one olefin is butene.

Organic composition (OC1) comprises preferably not more than 1.0 wt-% of dienes, preferably butadiene.

The compound containing oxygen and/or sulphur comprised in organic composition (OC1) may be selected from the group consisting of: ethers, alcohols, thiols, thioethers, sulfoxides, ketones, aldehydes or mixtures thereof.

Organic composition (OC1) comprises preferably not more than 20 wt-ppm, more preferably not more than 5 wt-ppm, most preferably not more than 1 wt-ppm of at least one compound containing oxygen and/or sulphur.

Transferring the outflow of the adsorber (A1) to the device (D1) in step b) or the content of the device (D1) into the adsorber (A1) in step c) (as defined below) generates for both cases a stream (S3).

In step c) the stream (S2) in the adsorber (A1) is completely or at least partially replaced by the content of the device (D1).

Preferably the stream (S2) in the adsorber (A1) is replaced by at least 10%, more preferably by at least 30%, most preferably by at least 40% by the content of the device (D1).

In a further embodiment of the invention
i) in step c), if stream (S2) and organic composition (OC1), form at least two separated compositions and/or phases, the composition and/or phase in the device (D1) with the higher content of organic composition (OC1) is the content of the device (D1) in step c) replacing the stream (S2) in the adsorber (A1) and/or
ii) the part of stream (S2) in the adsorber (A1) which is replaced in the adsorber (A1) by a part of content of the device in step c) is collected in the device (D1).

In step d) the adsorber (A1) is fed with an organic composition (OC2) comprising at least one olefin, at least one alkane and at least one compound containing oxygen and/or sulphur.

Organic composition (OC2) comprises preferably at most 80 wt-%, more preferably at most 70 wt-%, most preferably at most 50 wt-% of at least one alkane. Preferably the at least one alkane is butane.

Further, organic composition (OC2) comprises preferably at least 20 wt-%, more preferably at least 30 wt-%, most preferably at least 50 wt-% of at least one olefin. Preferably the at least one olefin is butene.

Preferably (OC2) comprises not more than 1.0 wt-% of dienes, preferably butadiene.

The compound containing oxygen and/or sulphur may be selected from the group consisting of: ethers, alcohols, thiols, thioethers, sulfoxides, ketones, aldehydes or mixtures thereof The organic composition (OC2) in step d) comprises preferably not more than 1000 wt-ppm of compounds containing oxygen and/or sulphur.

Preferably organic composition (OC2) comprises not more than 250 wt-ppm 1,2-dimethoxyethane (DME), not more than 150 wt-ppm methyl tertiary butyl ether (MTBE), not more than 50 wt-ppm acetone, not more than 50 wt-ppm methanol and/or not more than 50 wt-ppm methyl mercaptane.

The load of the adsorber (A1) with organic composition (OC2) in step d) may be increased gradually.

The organic composition (OC2) may be routed through the device (D1) before being fed into the adsorber (A1) according to step d).

Preferably the steps a) to d) are performed in the order step a) is followed by step b), step b) is followed by step c), step c) is followed by step d).

The invention may comprise a further step e), carried out prior to step a), wherein a stream (S1) comprising at least one alkane and at least one olefin, is hydrogenated to obtain a liquid or gaseous stream (S2).

The stream (S1) may comprise at least one alkane and at least one olefin in a total of at least 99 wt-%, more preferably in a total of at least 99.5 wt-%, most preferably in a total of at least 99.9 wt-%.

The stream (S1) may comprise butane and butene, preferably at least 96 wt-% butane and not more than 4 wt-% butene.

The hydrogenation may be carried out by any appropriate method known to the person skilled in the art.

Useful may be a catalyzed hydrogenation using at least a catalyst and a hydrogen source.

Preferably, the catalyst comprises d-block elements, more preferably, for example, Pd, Pt, Ru, Ir, Rh, Cu, Ni or Co, most preferably Pd, Ni, Pt or Rh, in particular preferably Pd or Ni.

The hydrogenation can be performed using $H_2$-gas and/or as catalytic transfer hydrogenation, employing for example ammonium formate, silyl hydrides, $NaBH_4$, cyclohexene or alcohols like methanol and propanol as hydrogen source. Preferably, the hydrogenation is carried out using $H_2$-gas as hydrogen source.

The hydrogen source and the solvent may be identical, for example, in the case of alcohols like methanol.

Any solvent known to the person skilled in the art being appropriate for performing the hydrogenation may be employed.

In general polar-protic, polar-nonprotic and/or unpolar solvents can be employed, for example methanol, ethanol, propanol, isopropanol, tetrahydrofurane or toluene.

Alternatively, the hydrogenation can be carried out without using any solvent.

In a preferred embodiment, the hydrogenation is carried out without the use of any solvent and with $H_2$-gas as hydrogen source.

Any reactor known to the person skilled in the art being appropriate for performing the hydrogenation may be employed.

Preferably a trickle bed reactor is employed for performing the hydrogenation.

In another embodiment of the invention the stream (S1) originates from the organic composition (OC2) which has been purified earlier by the same adsorber (A1) or by a similar further adsorber during the operation mode of the respective adsorber.

Preferably in the embodiment as specified in the preceding paragraph, an oligomerization of olefins, preferably a dimerization of butene to octene, and/or a distillation step to separate butane from butene is carried out prior to step e) and after the purification of the organic composition (OC2) employing at least one adsorber in its operation mode.

In another embodiment of the invention the adsorber (A1) to be regenerated in step a) to d) is part of an assembly which contains at least one further adsorber (A2), preferably the at least one further adsorber (A2) is under its operation mode during the regeneration of the first adsorber (A1) and/or each adsorber within this assembly is identical in respect of the adsorbent and/or its mode of operation.

The process according to the embodiment as specified in the preceding paragraph, wherein the at least one further adsorber (A2) is preferably in operation mode and/or
  i) in step d) the load of the further adsorber (A2) with organic composition (OC2) is gradually decreased at the same rate as the load of the first adsorber (A1) with organic composition (OC2) according to step d) is gradually increased and/or
  ii) in step d) the first adsorber (A1) and the at least one further adsorber (A2) are run with identical loads of organic composition (OC2) according to step d) then the at least one further adsorber (A2) is switched to regeneration mode.

Preferably in a time period not longer than 60 minutes, more preferably not longer than 20 minutes, most preferably not longer than 10 minutes, in particular preferably not longer than 5 minutes, the nominal hydraulic load of the first adsorber (A1) with stream (S2) is reduced from 100% to 50% and/or the nominal hydraulic load with stream (S2) of the further adsorber (A2) is increased from 0% to 50%.

The process for the regeneration of an adsorber (A1) may comprise an additional step f), prior to step a), wherein the liquid stream (S2) is converted into gaseous phase. The conversion of liquid stream (S2) into gaseous phase may be carried out by lowering the pressure and/or heating of the liquid stream (S2), preferably by employing at least one evaporator (EV1) and/or at least one super-heater (SH1) and/or at least one flash vessel (FV1).

In a preferred embodiment, liquid stream (S2), originating from step e), with a pressure of 5 to 80 bar, preferably of 10 to 50 bar, most preferably of 20 to 30 bar is, for the conversion according step f), fed into a flash vessel, wherein the pressure of liquid stream (S2) is lowered to 4 to 16 bar, preferably to 7 to 13 bar, most preferably to 8 to 11 bar.

Lowering the pressure of liquid stream (S2), preferably in a flash vessel, compared to the pressure of liquid (S2) obtained in step e), can result in conversion of at least a part of liquid stream (S2) into gaseous phase. Remaining liquid stream (S2) at lowered pressure may be converted into gaseous phase by use of at least one evaporator.

By lowering the pressure of liquid stream (S2), preferably in a flash vessel, compared to the pressure of liquid stream (S2) obtained in step a), 0 to 80%, preferably less than 10% of liquid stream (S2) may be converted into gaseous phase.

Alternatively, liquid stream (S2) may be converted into gaseous phase, preferably with at least one evaporator, without prior lowering the pressure compared to the pressure obtained for stream (S2) in step e).

Within the present invention, an evaporator is a device which converts a liquid stream into gaseous phase by transfer of heat to the liquid stream.

It is also possible to use two or more evaporators through which stream (S2) may flow in series and/or in parallel.

Any evaporator known to the person skilled in the art being appropriate for performing the evaporation may be applied.

Examples for evaporators are electric evaporators and evaporators transferring heat by means of a heat transfer medium, like steam (gaseous water) or other gaseous media, hydrocarbons, oils or salts. Preferably, the evaporators are of the Kettle-type.

The conversion of liquid stream (S2) into gaseous phase according to step f) may also comprise super-heating.

Super-heating, in the context of the present invention, means further increasing the temperature of the already gaseous stream (S2), preferably by transfer of heat to the gaseous stream (S2).

Any super-heater known to the person skilled in the art being appropriate for the super-heating may be applied.

Super-heating may be performed with one or more super-heaters. When more than one super-heater is used, the super-heaters can be arranged in series and/or in parallel.

Examples for possible super-heaters are electric super-heaters and super-heaters transferring heat by means of a heat transfer medium, suitable gaseous media, hydrocarbons, oils or salts. Preferably, super-heaters are of the shell-and-tube-type.

Evaporating and super-heating may be performed in different devices and/or be combined in at least one device capable to fulfill both functions, for instance a shell-and-tube heat exchanger stacked on top of a Kettle-type evaporator.

If evaporators and/or super-heaters based on a heat transfer medium are used, the same stream of heat transfer medium may be passed through only one evaporator or super-heater or through more than one evaporator or super-heater. The same stream of heat transfer medium can be used for evaporators or super-heaters or for evaporators and super-heaters.

The same type of heat transfer medium can be applied for all evaporators and/or super-heaters or different types of heat transfer media for each individual device or a group of evaporators and/or super-heaters may be used.

Dependent on the temperature actually required at a given time of the process, the heat transfer to the liquid or gaseous stream (S2) by the respective evaporators and/or super-heaters may be reduced, stopped completely and/or one or any number of evaporators and/or one or any number of super-heaters may be by-passed by stream (S2).

Preferably gaseous stream (S2) is passed through all evaporators and/or super-heaters and heat transfer is reduced or stopped when lower temperatures for gaseous stream (S2) are required.

Preferably evaporators and/or super-heaters are by-passed if liquid stream (S2) is required.

The process for the regeneration of an adsorber (A1), may comprise a further step g), wherein prior to carrying out step a) a draining step is carried out in order to at least partially remove an organic composition (OC1) which was purified by the adsorber (A1) during its operation mode, optionally the organic composition (OC1) obtained in the draining step g) is collected in a device (D1).

Preferably at least 10 wt-%, more preferably at least 30 wt-%, more preferably at least 40 wt-% of the organic composition (OC1) is removed during the draining step g).

One further embodiment of the invention comprises at least one, preferably all of the following features i) to vi):
  i) in step e), the stream (S1) comprises butane and butene, preferably at least 96 wt-% butane and not more than 4 wt-% butene, and/or
  ii) the stream (S2) comprises not more than 1000 wt-ppm olefin, preferably not more than 500 wt-ppm olefin, most preferably not more than 100 wt-ppm olefin, preferably the olefin is butene, and/or
  iii) the stream (S2) comprises at least 99 wt-% of at least one alkane, preferably at least 99.5 wt-% of at least one alkane, most preferably at least 99.9 wt-% of at least one alkane, preferably the alkane is butane and/or
  iv) the organic composition (OC2) in step d) comprises not more than 1000 wt-ppm of compounds containing oxygen and/or sulphur, and/or
  v) the load of the adsorber (A1) with organic composition (OC2) in step d) is increased gradually, and/or
  vi) the organic composition (OC2) is routed through the device (D1) before being fed into the adsorber (A1) according to step d).

FIGURES

The FIGS. 1 to 4 illustrate certain aspects of the invention. For the sake of clarity not all applicable components and embodiments are drawn in one and/or all figures.

Embodiments shown in different figures may be combined with each other and do not exclude the incorporation of further components within the limits of the disclosure of the specification.

FIG. 1 illustrates the most basic assembly of the present invention. The adsorber (A1) is regenerated by contact with gaseous stream (S2) fed into the adsorber in opposite direction to the direction of flow of stream (OC2). Stream (S2) can alternatively be fed into the adsorber (A1) according to the direction of flow of stream (OC2) during other steps of the regeneration process. Stream (OC2) comprises organic composition (OC2). Stream (OC1) is leaving adsorber (A1) on the opposite end of adsorber (A1), chosen for the introduction of stream (OC2) into the adsorber (A1). Stream (OC1) comprises organic composition (OC1). Stream (OC2) can be fed directly into the adsorber (A1) or prior routed through device (D1). The streams (OC1) and (OC2) are only present during operation mode. The stream (S3) may comprise organic composition (OC1) and/or stream (S2) and/or stream (OC2). Stream (S3) is either collected in a device (D1) or transferred from the device (D1) to the adsorber (A1). During step a) according to claim 8 or when stream (S3) is transferred to the adsorber (A1) another stream (S2) at the opposite end of the adsorber (A1) compared to the side connected to the device (D1) can occur. In one embodiment of the invention, this stream (S2) can, if occurring during the transfer of stream (S3) to the adsorber (A1), optionally be routed to the device (D1). The stream (S4) comprises at least the stream (S2) and/or compounds containing oxygen and/or sulfur. The stream (S4) is leaving adsorber (A1) during regeneration mode, in regeneration step a) of the process of the present invention, but not during operation mode of the adsorber (A1). Stream (S4) may leave the adsorber according to or opposite to the direction of flow of stream (OC2). Preferably stream (S4) leaves the adsorber during the steps a1), a2) and/or a3) opposite to the direction of flow of stream (OC2) and/or during the steps a4) and/or a5) according to the direction of flow of stream (OC2). Stream (S4) may additionally comprise (compared to stream (S2)) those elements (such as compounds containing oxygen and/or sulphur) which were adsorbed by the adsorber from stream (OC2) during its operation mode.

Figure 2:
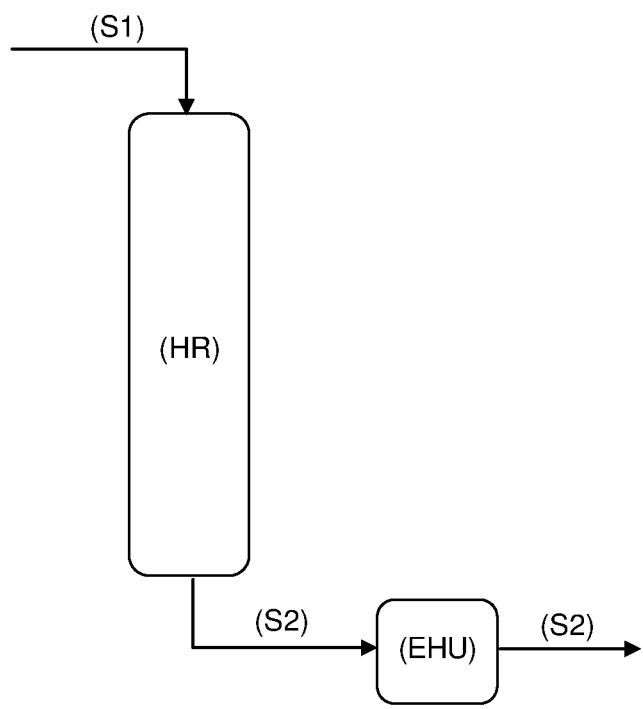

FIG. 2 demonstrates one possible embodiment, in which liquid stream (S2) is obtained by hydrogenation of stream (S1). The stream (S1) is fed into a hydrogenation reactor (HR). The outflow comprises liquid stream (S2) which is routed to the evaporation/heating unit (EHU).

Figure 3:
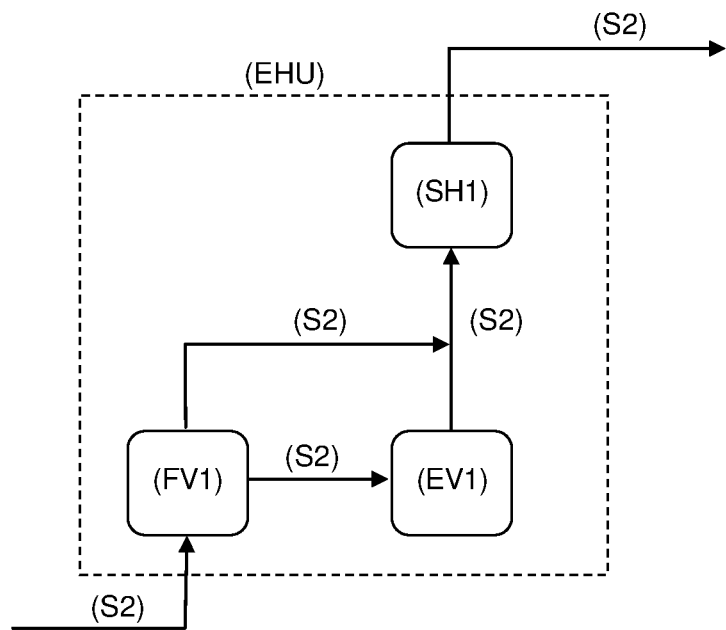

In FIG. 3 demonstrates one possible embodiment for evaporation/heating unit (EHU). Liquid stream (S2) is fed into a flash vessel (FV1) and routed from there directly and/or indirectly over an evaporator (EV1) to a super heater (SH1). Coming from super heater (SH1) stream (S2) can be routed to the adsorber (A1) as illustrated for example in FIG. 1.

Figure 4:
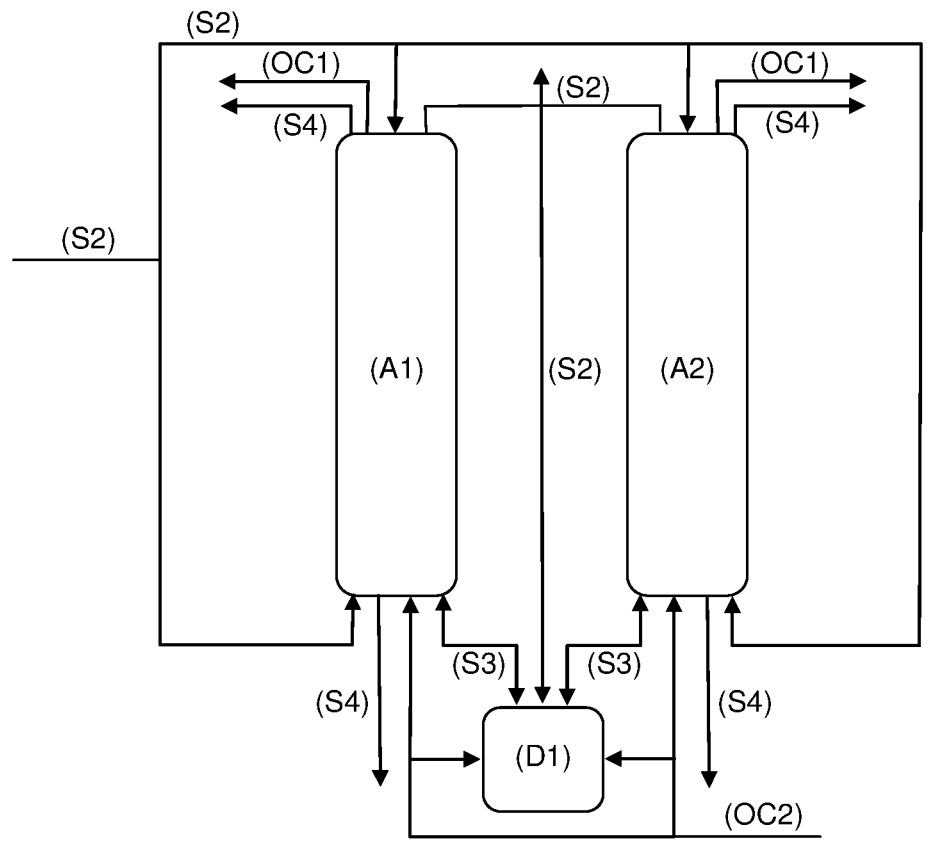

FIG. 4 shows a further alternative embodiment, using two adsorbers (A1) and (A2) in parallel. The adsorbers can be operated simultaneously in the same mode or one in regeneration mode and the other in operation mode.

The invention claimed is:

1. A process for regenerating an adsorber, comprising:
   A) providing an adsorber (A1) comprising an adsorbent comprising at least one compound containing oxygen or sulfur adsorbed thereon and a purified organic composition (OC1) comprising at least one olefin, at least one alkane and optionally at least one compound oxygen or sulfur;
   B) draining the adsorber (A1) to at least partially remove the purified organic composition (OC1) to result in the adsorber (A1) comprising a residual of the purified organic composition (OC1) and the adsorbent comprising the at least one compound containing oxygen or sulfur adsorbed thereon;
   C) regenerating the adsorber (A1) comprising the residual of the organic composition (OC1) and the adsorbent comprising the at least one compound containing oxygen or sulfur thereon by contacting with a gaseous stream (S2) to obtain an outflow comprising the gaseous stream (S2), the residual of the purified organic composition (OC1), and the at least one compound containing oxygen or sulfur;
   D) at least partially condensing the outflow by employing at least one condenser, a cooler, or both;
   E) collecting as a content in a device (D1) the at least partially condensed outflow comprising the gaseous stream (S2), the residual of the purified organic composition (OC1) and the at least one compound containing oxygen or sulfur;
   F) replacing the gaseous stream (S2) in the adsorber (A1) completely or at least partially by the content of the device (D1); and then
   G) feeding the adsorber (A1) with an organic composition (OC2) comprising at least one olefin, at least one alkane, and at least one compound containing oxygen or sulfur and adsorbing the at least one compound containing oxygen or sulfur in the organic composition (OC2) to obtain the adsorber (A1) of step A), wherein the organic composition (OC2) comprises at least 20 wt-% of the at least one olefin, at most 80 wt-% of the at least one alkane, and no more than 1 wt-% of dienes.

2. The process according to claim 1, further comprising, prior to step A), hydrogenating a stream (S1) comprising at least one alkane and at least one olefin to obtain:
   the gaseous stream (S2) comprising the at least one alkane and a reduced amount of the at least one olefin; or
   a liquid stream (S2') comprising the at least one alkane and a reduced amount of the at least one olefin, and converting the liquid stream (S2') into the gaseous stream (S2) comprising the at least one alkane and the reduced amount of the at least one olefin.

3. The process according to claim 2, wherein
   i) the stream (S1) comprises butane and butene; or
   ii) the gaseous stream (S2) comprises not more than 1000 wt-ppm olefin; or
   iii) the gaseous stream (S2) comprises at least 99 wt-% of at least one alkane; or
   iv) the organic composition (OC2) in step G) comprises not more than 1000 wt-ppm of compounds containing oxygen or sulfur; or
   v) a load of the adsorber (A1) with the organic composition (OC2) in step G) is increased gradually; or
   vi) the organic composition (OC2) is routed through the device (D1) before being fed into the adsorber (A1) according to step G).

4. The process according to claim 3, wherein
   i) the gaseous stream (S2) comprises at least 99 wt-% of butane, or
   ii) the stream (S1) comprises at least 96 wt-% butane and not more than 4 wt-% butene.

5. The process according to claim 2, wherein the stream (S1) originates from the purified organic composition (OC1) or from a further purified organic composition obtained from a further adsorber in operation mode.

6. The process according to claim 5, further comprising:
   oligomerizing the at least partially removed purified organic composition (OC1) or the further purified organic composition to obtain an oligomerized composition comprising butane and butene; or
   separating butane from butene in the at least partially removed purified organic composition (OC1) or in the further purified organic composition by distillation to obtain the stream (S1), wherein the stream (S1) comprises at least 96 wt % of butane and not more than 4 wt % of butene, and the purified organic composition (OC1) or the further purified organic composition comprising comprises at most 80 wt % of butane, at least 20 wt % of butene and a reduced amount of compounds containing oxygen, sulfur or both oxygen and sulfur.

7. The process according to claim 6, wherein the oligomerizing comprises dimerizing butene to octene.

8. The process according to claim 2, wherein the liquid stream (S2') is converted into the gaseous stream (S2) by lowering [[the]] pressure of the liquid stream (S2') or by heating the liquid stream (S2').

9. The process according to claim 8, wherein the converting the liquid stream (S2') into the gaseous stream (S2) is carried out by employing at least one evaporator (EV1), at least one super-heater (SH1), or at least one flash vessel (FV1).

10. The process according to claim 1, further comprising optionally collecting the at least partially removed, purified organic composition (OC1) in the device (D1).

11. The process according to claim 1, wherein step C) comprises:
   b1) heating the adsorber (A1) by contact with the gaseous stream (S2), wherein the gaseous stream (S2) is condensed within the adsorber (A1);
   b2) further heating the adsorber (A1) by contact with the gaseous stream (S2) up to a temperature in a range of 230 to 270° C. without any condensation of the gaseous stream (S2) within the adsorber (A1);
   b3) regenerating the adsorber (A1) at a temperature in a range of 230 to 270° C. by contact with the gaseous stream (S2); and then
   b4) cooling the adsorber (A1) by contact with
      the gaseous stream (S2) to a temperature in a range of 80° C. to 120° C.,
      the liquid stream (S2') to a temperature below 80° C., or
      the gaseous stream (S2) to a temperature in a range of 80° C. to 120° C. and then the liquid stream (S2') to a temperature below 80° C.

12. The process according to claim 11, wherein a flow direction of the gaseous stream (S2) through the adsorber (A1) in steps b1), b2), b3), and/or E) is opposite to a flow direction of any organic composition through the adsorber (A1) during its operation mode, or the gaseous stream (S2) in step b4) or the liquid stream (S2') in step b4) has the same flow direction through the adsorber (A1) as any organic composition through the adsorber (A1) during its operation mode.

13. The process according to claim 11, wherein:
the at least partially removed, purified organic composition (OC1) is optionally collected in the device (D1);
steps C)-E) are carried out at the same time; and
step b4) comprises cooling the absorber adsorber (A1) by contact with the gaseous stream (S2) to a temperature in a range of 80° C. to 120° C., and then the liquid stream (S2') to a temperature below 80° C.

14. The process according to claim 1, wherein the adsorber (A1) is based on aluminum oxide or the adsorber (A1) adsorbs compounds comprising oxygen or sulfur out of organic compositions.

15. The process according to claim 14, wherein the adsorber (A1) adsorbs at least one selected from the group consisting of an ether, an alcohol, a thiol, a thioether, a sulfoxide, a ketone, and an aldehyde.

16. The process according to claim 1, wherein
i) a heating rate of the adsorber (A1) does not exceed 60° C/h, or
ii) a temperature of the gaseous stream (S2) is not more than 100° C. higher than a temperature of the adsorber (A1), or
iii) a temperature of the gaseous stream (S2) is not more than 100° C. lower than a temperature of the adsorber (A1).

17. The process according to claim 1, wherein the adsorber (A1) is part of an assembly comprising at least one further adsorber (A2) comprising an adsorbent.

18. The process according to claim 17, wherein the at least one further adsorber (A2) is in operation mode and:
i) in step G) a load of the at least one further adsorber (A2) with the organic composition (OC2) is gradually decreased at the same rate as a load of the adsorber (A1) with the organic composition (OC2) according to step G) is gradually increased; or
ii) in step G) the adsorber (A1) and the at least one further adsorber (A2) are run with identical loads of the organic composition (OC2), wherein the at least one further adsorber (A2) is subsequently switched to regeneration mode.

19. The process according to claim 17, wherein:
the at least one further adsorber (A2) is under its operation mode during regeneration mode of the adsorber (A1); or
each adsorber within the assembly comprises the same adsorbent or has the same mode of operation.

20. The process according to claim 1, wherein
i) in step F), if the gaseous stream (S2) and the purified organic composition (OC1) form at least two separated phases in the device (D1), the phase in the device (D1) with the higher content of the purified organic composition (OC1) is the content of the device (D1) in step F) replacing the stream (S2) in the adsorber (A1), or
ii) the gaseous stream (S2) in the adsorber (A1) which is replaced completely or at least partially by the content of the device (D1) in step G) is collected in the device (D1).

\* \* \* \* \*